(12) United States Patent
Tsuchihashi et al.

(10) Patent No.: US 7,379,020 B2
(45) Date of Patent: May 27, 2008

(54) APPARATUS AND METHOD FOR ESTIMATING DIRECTION OF ARRIVAL OF RADIO WAVE

(75) Inventors: Masataka Tsuchihashi, Kobe (JP); Yasushi Seike, Kobe (JP); Kazuo Shirakawa, Kawasaki (JP); Jingmin Xin, Kawasaki (JP)

(73) Assignee: Fujitsu Limited, Kawasaki-Shi (JP)

( * ) Notice: Subject to any disclaimer, the term of this patent is extended or adjusted under 35 U.S.C. 154(b) by 0 days.

(21) Appl. No.: 11/372,667

(22) Filed: Mar. 10, 2006

(65) Prior Publication Data

US 2006/0208947 A1  Sep. 21, 2006

(30) Foreign Application Priority Data

Mar. 16, 2005  (JP)  ............................. 2005-074527

(51) Int. Cl.
*G01S 5/02* (2006.01)
(52) U.S. Cl. ...................................... 342/417; 342/420
(58) Field of Classification Search ................ 342/417, 342/420, 437, 442, 443
See application file for complete search history.

(56) References Cited

U.S. PATENT DOCUMENTS

| | | | | |
|---|---|---|---|---|
| 5,631,898 | A * | 5/1997 | Dent | 370/203 |
| 6,075,484 | A * | 6/2000 | Daniel et al. | 342/372 |
| 6,836,245 | B2 * | 12/2004 | Kishigami et al. | 342/417 |
| 7,088,956 | B2 * | 8/2006 | Kishigami et al. | 455/65 |
| 7,117,016 | B2 * | 10/2006 | Kisigami et al. | 455/562.1 |

FOREIGN PATENT DOCUMENTS

| | | |
|---|---|---|
| JP | 2002-148324 | 5/2002 |
| JP | 2004-198218 | 7/2004 |

OTHER PUBLICATIONS

Patent Abstract of Japan, Publication No. 2002148324 A, published May 22, 2002, in the name of Hirakawa et al.
Patent Abstract of Japan, Publication No. 2004198218 A, published Jul. 15, 2004, in the name of Shirodono et al.
Nobuyoshi Kikuma, *Adaptive Signal Processing by Array Antenna*, Kagaku Gijutsu Shuppan, Nov. 25, 1998, pp. 173-268.

* cited by examiner

*Primary Examiner*—Dao Phan
(74) *Attorney, Agent, or Firm*—Christie, Parker & Hale, LLP

(57) ABSTRACT

A radio wave direction-of-arrival estimation apparatus and method that can estimate, at high speed and with good accuracy, the direction of arrival of a plurality of incoming waves having high correlation. The radio wave direction-of-arrival estimation apparatus includes: an array antenna constructed from a plurality of antenna elements; a receiver for receiving an incoming wave via each of the antenna elements; a correlation matrix calculator for calculating a correlation matrix from each received signal; a correction matrix adder for adding a correction matrix having a suitable correction value only at a specific matrix element to the calculated correlation matrix; an inverse matrix calculator for calculating the inverse matrix of the correlation matrix to which the correction matrix has been added; a weight vector calculator for calculating a weight vector based on the calculated inverse matrix; an angular spectrum calculator for calculating an angular spectrum by using the calculated weight vector; and a direction-of-arrival estimator for estimating the direction of arrival of the incoming wave from the peak waveform of the calculated angular spectrum.

20 Claims, 10 Drawing Sheets

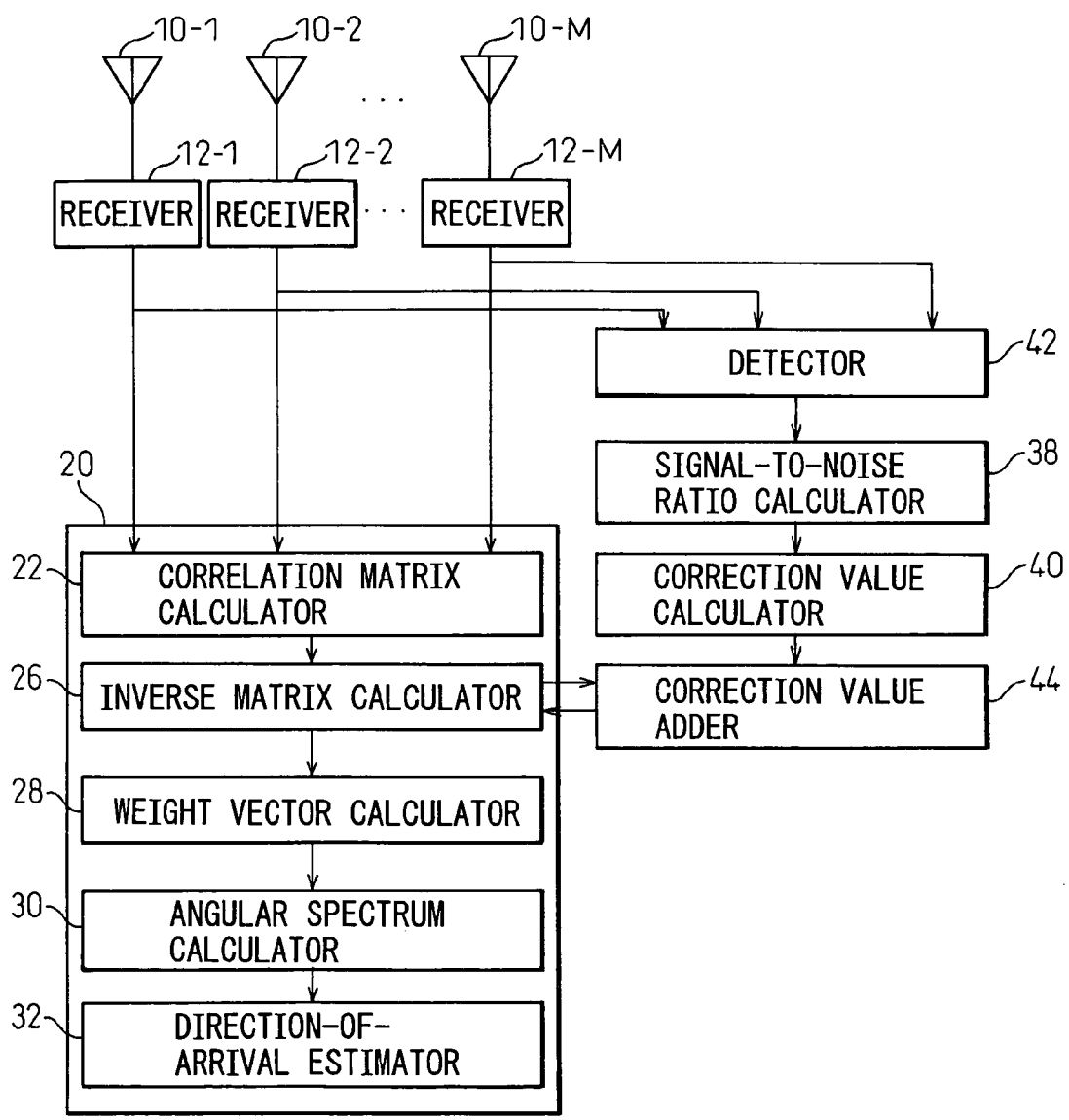

Fig.9(A) $\begin{bmatrix} 1 & 2 & 3 \\ 2 & 3 & 4 \\ 3 & 4 & 6 \end{bmatrix} \begin{bmatrix} 1 & 0 & 0 \\ 0 & 1 & 0 \\ 0 & 0 & 1 \end{bmatrix}$ Fig.9(B) $\begin{bmatrix} 1 & 2 & 3 \\ 2 & 3 & 4 \\ 3 & 4 & 6 \end{bmatrix} \begin{bmatrix} 1 & 0 & 0 \\ 0 & 1 & 0 \\ 0 & 0 & 1 \end{bmatrix}$ Fig.9(C) $\begin{bmatrix} 1 & 2 & 3 \\ 0 & -1 & -2 \\ 0 & -2 & -3 \end{bmatrix} \begin{bmatrix} 1 & 0 & 0 \\ -2 & 1 & 0 \\ -3 & 0 & 1 \end{bmatrix}$ Fig.9(D) $\begin{bmatrix} 1 & 2 & 3 \\ 0 & 1 & 2 \\ 0 & -2 & -3 \end{bmatrix} \begin{bmatrix} 1 & 0 & 0 \\ 2 & -1 & 0 \\ -3 & 0 & 1 \end{bmatrix}$ Fig.9(E) $\begin{bmatrix} 1 & 0 & -1 \\ 0 & 1 & 2 \\ 0 & 0 & 1 \end{bmatrix} \begin{bmatrix} -3 & 2 & 0 \\ 2 & -1 & 0 \\ 1 & -2 & 1 \end{bmatrix}$ Fig.9(F) $\begin{bmatrix} 1 & 0 & -1 \\ 0 & 1 & 2 \\ 0 & 0 & 1 \end{bmatrix} \begin{bmatrix} -3 & 2 & 0 \\ 2 & -1 & 0 \\ 1 & -2 & 1 \end{bmatrix}$ Fig.9(G) $\begin{bmatrix} 1 & 0 & 0 \\ 0 & 1 & 0 \\ 0 & 0 & 1 \end{bmatrix} \begin{bmatrix} -2 & 0 & 1 \\ 0 & 3 & -2 \\ 1 & -2 & 1 \end{bmatrix}$ Fig.9(H) $\begin{bmatrix} 1 & 2 & 3 \\ 2 & 3 & 4 \\ 3 & 4 & 6 \end{bmatrix} \begin{bmatrix} -2 & 0 & 1 \\ 0 & 3 & -2 \\ 1 & -2 & 1 \end{bmatrix} = \begin{bmatrix} 1 & 0 & 0 \\ 0 & 1 & 0 \\ 0 & 0 & 1 \end{bmatrix}$

APPARATUS AND METHOD FOR ESTIMATING DIRECTION OF ARRIVAL OF RADIO WAVE

CROSS-REFERENCE TO RELATED APPLICATION

This application claims priority of Japanese Patent Application No. 2005-074527, filed on Mar. 16, 2005.

BACKGROUND OF THE INVENTION

1. Field of the Invention

The present invention relates to an apparatus and method for estimating the direction of arrival of a radio wave and, more particularly, to a radio wave direction-of-arrival estimation apparatus and method, for use at a radar or radio base station or the like, that receives a single radio wave or a plurality of radio waves arriving from various directions by an array antenna constructed from a plurality of antenna elements and that estimates the direction of arrival of the radio waves at high speed and with good accuracy.

2. Description of the Related Art

In the prior art, there have been proposed a variety of radio wave direction-of-arrival estimation techniques for estimating the direction of arrival of radio waves by using an array antenna constructed from a plurality of antenna elements. Classical methods known in the art include the beam former method, the Capon method, and the linear prediction method; further, high-resolution techniques such as MUSIC (MUltiple SIgnal Classification) and ESPRIT (Estimation of Signal Parameters via Rotational Invariance Techniques) are also known in the art. These techniques are described in detail by Nobuyoshi Kikuma in "Adaptive Signal Processing by Array Antenna," Kagaku Gijutsu Shuppan, Nov. 25, 1998, pp. 173-268.

In recent years, MUSIC and ESPRIT, which are capable of achieving high resolution, have been used widely, and research has been proceeding. However, with MUSIC and ESPRIT, as the direction of arrival is estimated by performing eigenvalue decomposition, the amount of computation is enormous, and it is difficult to speed up the estimation process.

On the other hand, with the Capon method and the linear prediction method, as eigenvalue decomposition is not required, the estimation process can be speeded up, but both methods require the calculation of an inverse matrix, which poses a problem. In addition, when a plurality of incoming waves having high correlation are received, the correlation matrix of the received signals is often singular; in this case, if its inverse matrix is calculated, the obtained inverse matrix may become a singular solution or the computation may stop; therefore, it takes time to estimate the direction of arrival or the estimation accuracy may drop and, in the worst case, it may become impossible to output the estimation result.

SUMMARY OF THE INVENTION

The present invention has been devised in view of the above problems, and an object of the invention is to provide a radio wave direction-of-arrival estimation apparatus and method that can estimate, at high speed and with good accuracy, the direction of arrival of a plurality of incoming waves having high correlation.

To achieve the above object, according to the present invention, there is provided a radio wave direction-of-arrival estimation apparatus comprising: an array antenna constructed from a plurality of antenna elements; a receiver for receiving an incoming wave via each of the antenna elements of the array antenna; a correlation matrix calculating unit for calculating a correlation matrix from each signal received by the receiver; a correction matrix adding unit for adding a correction matrix having a correction value at a specific matrix element to the correlation matrix calculated by the correlation matrix calculating unit; an inverse matrix calculating unit for calculating an inverse matrix of the correlation matrix to which the correction matrix has been added by the correction matrix adding unit; and a direction-of-arrival estimating unit for estimating the direction of arrival of the incoming wave based on the inverse matrix calculated by the inverse matrix calculating unit.

According to the present invention, there is also provided a radio wave direction-of-arrival estimation apparatus comprising: an array antenna constructed from a plurality of antenna elements; a receiver for receiving an incoming wave via each of the antenna elements of the array antenna; a correlation matrix calculating unit for calculating a correlation matrix from each signal received by the receiver; an inverse matrix calculating unit for calculating an inverse matrix of the correlation matrix calculated by the correlation matrix calculating unit; a correction value adding unit for adding a correction value to a specific matrix element when the specific matrix element is determined to be smaller than a predetermined value during the calculation of the inverse matrix being performed by the inverse matrix calculating unit; and a direction-of-arrival estimating unit for estimating the direction of arrival of the incoming wave based on the inverse matrix calculated by the inverse matrix calculating unit.

According to the present invention, there is also provided a radio wave direction-of-arrival estimation apparatus comprising: an array antenna constructed from a plurality of antenna elements; a receiver for receiving an incoming wave via each of the antenna elements of the array antenna; a correlation matrix calculating unit for calculating a correlation matrix from each signal received by the receiver; an inverse matrix calculating unit for calculating an inverse matrix of the correlation matrix calculated by the correlation matrix calculating unit; a correction matrix adding unit for adding a correction matrix having a correction value at a specific matrix element to the correlation matrix during the calculation of the inverted matrix when any specific matrix element is determined to be smaller than a predetermined value during the calculation of the inverse matrix being performed by the inverse matrix calculating unit; and a direction-of-arrival estimating unit for estimating the direction of arrival of the incoming wave based on the inverse matrix calculated by the inverse matrix calculating unit.

In one preferred mode of the radio wave direction-of-arrival estimation apparatus, the apparatus further comprises a correction value storing unit for prestoring the correction value.

In one preferred mode of the radio wave direction-of-arrival estimation apparatus, the apparatus further comprises: a signal-to-noise ratio calculating unit for calculating a signal-to-noise ratio for each signal received by the receiver; and a correction value calculating unit for calculating the correction value based on the signal-to-noise ratio calculated by the signal-to-noise ratio calculating unit.

In one preferred mode of the radio wave direction-of-arrival estimation apparatus, the specific matrix element is a diagonal matrix element, a total matrix element, an upper subdiagonal matrix element, a lower subdiagonal matrix element, an upper triangular matrix element, a lower triangular matrix element, or a tridiagonal matrix element.

In one preferred mode of the radio wave direction-of-arrival estimation apparatus, the specific matrix element is a matrix element constructed from a combination of at least two matrix elements selected from among a diagonal matrix element, a total matrix element, an upper subdiagonal matrix element, a lower subdiagonal matrix element, an upper triangular matrix element, a lower triangular matrix element, and a tridiagonal matrix element.

In one preferred mode of the radio wave direction-of-arrival estimation apparatus, the apparatus further comprises a unit for calculating a weight vector from the inverse matrix and a unit for calculating an angular spectrum from the weight vector, wherein the weight vector calculating unit calculates the weight vector in accordance with a Capon method, and the angular spectrum calculating unit calculates the angular spectrum in accordance with the Capon method.

In one preferred mode of the radio wave direction-of-arrival estimation apparatus, the apparatus further comprises a unit for calculating a weight vector from the inverse matrix and a unit for calculating an angular spectrum from the weight vector, wherein the weight vector calculating unit calculates the weight vector in accordance with a linear prediction method, and the angular spectrum calculating unit calculates the angular spectrum in accordance with the linear prediction method.

According to the present invention, there is also provided a radio wave direction-of-arrival estimation method comprising the steps of: calculating a correlation matrix from each signal received by a receiver via each antenna element of an array antenna; adding a correction matrix having a correction value at a specific matrix element to the calculated correlation matrix; calculating an inverse matrix of the correlation matrix to which the correction matrix has been added; and estimating the direction of arrival of an incoming wave based on the calculated inverse matrix.

According to the present invention, there is also provided a radio wave direction-of-arrival estimation method comprising the steps of: calculating a correlation matrix from each signal received by a receiver via each antenna element of an array antenna; calculating an inverse matrix of the calculated correlation matrix; adding a correction value to a specific matrix element when the specific matrix element is determined to be smaller than a predetermined value during the calculation of the inverse matrix; and estimating the direction of arrival of an incoming wave based on the calculated inverse matrix.

According to the present invention, there is also provided a radio wave direction-of-arrival estimation method comprising the steps of: calculating a correlation matrix from each signal received by a receiver via each antenna element of an array antenna; calculating an inverse matrix of the calculated correlation matrix; adding a correction matrix having a correction value at a specific matrix element to the correlation matrix during the calculation of the inverse matrix when any specific matrix element is determined to be smaller than a predetermined value during the calculation of the inverse matrix; adding the correction value to the specific matrix element; and estimating the direction of arrival of an incoming wave based on the calculated inverse matrix.

In one preferred mode of the radio wave direction-of-arrival estimation method, the method further comprises the step of prestoring the correction value.

In one preferred mode of the radio wave direction-of-arrival estimation method, the method further comprises the steps of: calculating a signal-to-noise ratio for the each received signal; and calculating the correction value based on the calculated signal-to-noise ratio.

In one preferred mode of the radio wave direction-of-arrival estimation method, the specific matrix element is a diagonal matrix element, a total matrix element, an upper subdiagonal matrix element, a lower subdiagonal matrix element, an upper triangular matrix element, a lower triangular matrix element, or a tridiagonal matrix element.

In one preferred mode of the radio wave direction-of-arrival estimation method, the specific matrix element is a matrix element constructed from a combination of at least two matrix elements selected from among a diagonal matrix element, a total matrix element, an upper subdiagonal matrix element, a lower subdiagonal matrix element, an upper triangular matrix element, a lower triangular matrix element, and a tridiagonal matrix element.

In one preferred mode of the radio wave direction-of-arrival estimation method, the method further comprises the step of calculating a weight vector based on the inverse matrix and the step of calculating an angular spectrum by using the weight vector, wherein the weight vector calculating step calculates the weight vector in accordance with a Capon method, and the angular spectrum calculating step calculates the angular spectrum in accordance with the Capon method.

In one preferred mode of the radio wave direction-of-arrival estimation method, the method further comprises the step of calculating a weight vector based on the inverse matrix and the step of calculating an angular spectrum by using the weight vector, wherein the weight vector calculating step calculates the weight vector in accordance with a linear prediction method, and the angular spectrum calculating step calculates the angular spectrum in accordance with the linear prediction method.

According to the present invention, there is also provided a radar apparatus equipped with a radio wave direction-of-arrival estimation apparatus comprising: an array antenna constructed from a plurality of antenna elements; a receiver for receiving an incoming wave via each of the antenna elements of the array antenna; a correlation matrix calculating unit for calculating a correlation matrix from each signal received by the receiver; a correction matrix adding unit for adding a correction matrix having a correction value at a specific matrix element to the correlation matrix calculated by the correlation matrix calculating unit; an inverse matrix calculating unit for calculating an inverse matrix of the correlation matrix to which the correction matrix has been added by the correction matrix adding unit; and a direction-of-arrival estimating unit for estimating the direction of arrival of the incoming wave based on the inverse matrix calculated by the inverse matrix calculating unit.

According to the present invention, there is also provided a radar apparatus equipped with a radio wave direction-of-arrival estimation apparatus comprising: an array antenna constructed from a plurality of antenna elements; a receiver for receiving an incoming wave via each of the antenna elements of the array antenna; a correlation matrix calculating unit for calculating a correlation matrix from each signal received by the receiver; an inverse matrix calculating unit for calculating an inverse matrix of the correlation matrix calculated by the correlation matrix calculating unit; a correction value adding unit for adding a correction value to a specific matrix element when the specific matrix element is determined to be smaller than a predetermined value during the calculation of the inverse matrix being performed by the inverse matrix calculating unit; and a direction-of-arrival estimating unit for estimating the direction of arrival of the incoming wave based on the inverse matrix calculated by the inverse matrix calculating unit.

The novel radio wave direction-of-arrival estimation apparatus and method according to the present invention solves all of the previously described problems. That is, in the radio wave direction-of-arrival estimation apparatus and method according to the present invention, the correlation matrix for the received signals is normalized by adding a correction matrix or a correction value when calculating its inverse matrix; this eliminates the possibility of a singular solution being found or the computation being stopped, and serves to shorten the estimation time and enhance the estimation accuracy, while reliably avoiding a situation where the result cannot be output.

BRIEF DESCRIPTION OF THE DRAWINGS

Further features and advantages of the present invention will be apparent from the following description with reference to the accompanying drawings, in which:

FIG. 8 is a block diagram showing an eighth embodiment of a radio wave direction-of-arrival estimation apparatus according to the present invention;

FIGS. 9(A) to 9(H) are diagrams for explaining the procedure of inverse matrix calculation in accordance with the Gauss-Jordan method.

DESCRIPTION OF THE PREFERRED EMBODIMENTS

Figure 1:
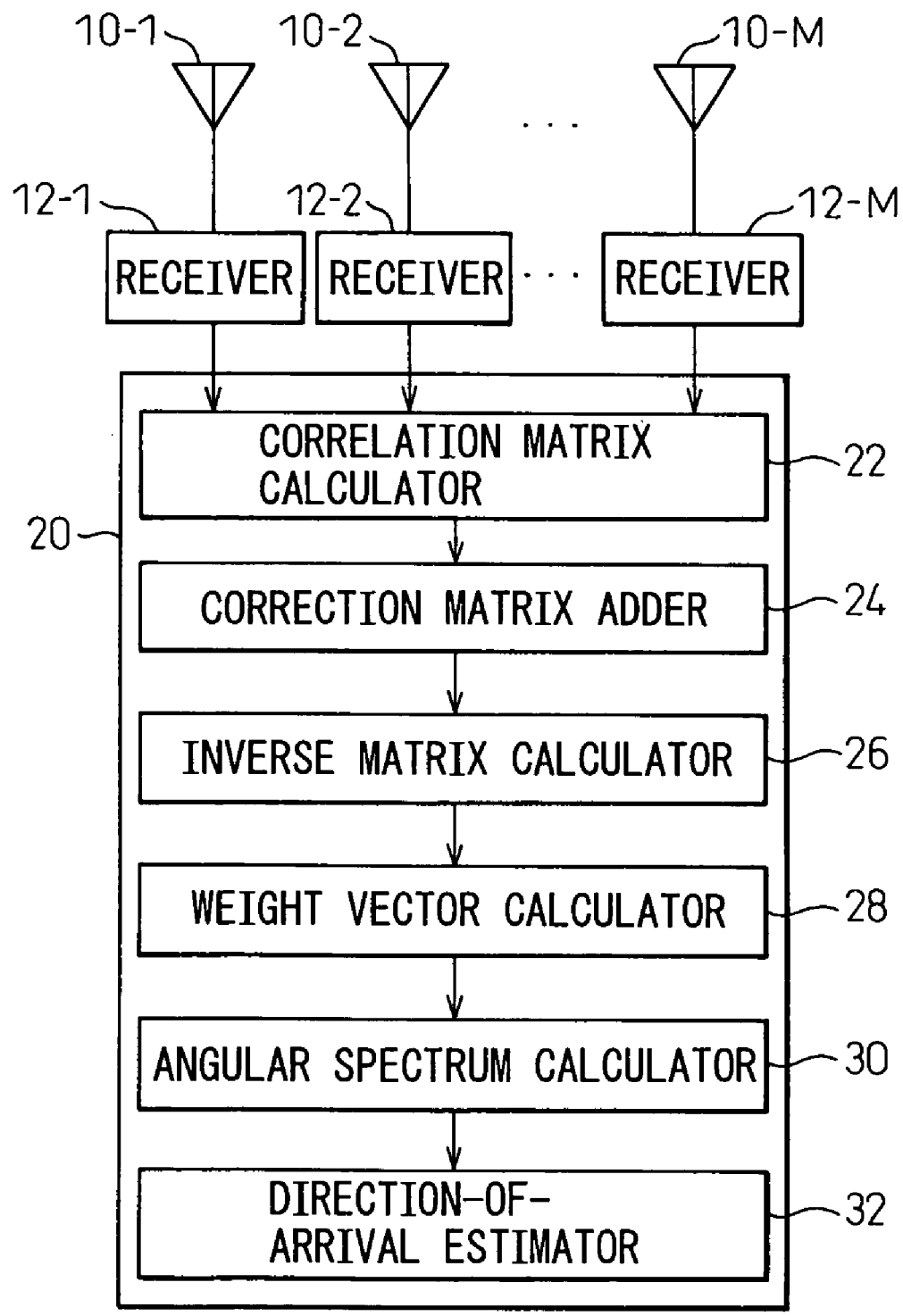
FIG. 1 is a block diagram showing a first embodiment of a radio wave direction-of-arrival estimation apparatus according to the present invention.

First, the differences between radio wave direction-of-arrival estimation methods according to the prior art and radio wave direction-of-arrival estimation methods according to the present invention will be described in order to clarify the principles of the present invention.

In a prior art radio wave direction-of-arrival estimation method based on inverse matrix calculation, when the eigenvalues and eigenvectors of the correlation matrix obtained from the signals received by an M-element array antenna are denoted as $\lambda_k$ and $e_k$ (k=1, 2, . . . , M), respectively, and the matrix is expanded in terms of its eigenvalues, the correlation matrix $R_{xx}$ is given by the following equation (1). Here, $e_k^H$ is a complex conjugate transpose matrix of $e_k$.

$$R_{xx} = \sum_{k=1}^{M} \lambda_k e_k e_k^H \quad (1)$$

Calculating the inverse matrix of the correlation matrix, the following equation (2) is obtained; here, if the signal component that contains noise is very small in value, the denominator becomes close to zero and the elements of the inverse matrix of the correlation matrix become infinitely large, which will have serious effects on the subsequent calculations of the weight vector and angular spectrum. This phenomenon occurs when the original correlation matrix is singular.

$$R_{xx}^{-1} = \sum_{k=1}^{M} \frac{1}{\lambda_k} e_k e_k^H \quad (2)$$

In view of this, a first method according to the present invention aims to suppress this phenomenon by adding a correction matrix $C=c_0 I$ to the correlation matrix prior to the calculation of the inverse matrix. To describe this more specifically, $c_0$ in the correction matrix C to be added is a scalar that indicates a correction value, and its value is of such a magnitude that does not affect the signal component. Further, I is an M×M unit matrix. That is, as shown in equation (3) below, the correction matrix is a diagonal matrix having the correction value at diagonal components (diagonal matrix elements).

$$C = cI = c_0 \begin{bmatrix} 1 & 0 & \cdots & 0 \\ 0 & \ddots & \ddots & \vdots \\ \vdots & \ddots & \ddots & 0 \\ 0 & \cdots & 0 & 1 \end{bmatrix} \quad (3)$$

The correction matrix is added to the correlation matrix, and the sum is expanded in terms of its eigenvalues, to yield the following equation (4).

$$R'_{xx} = R_{xx} + C = R_{xx} + c_0 I = \sum_{k=1}^{M} (\lambda_k + c_0) e_k e_k^H \quad (4)$$

Then, calculating the inverse matrix, the following equation (5) is obtained; as can be seen, even when the signal component that contains noise is very small in value, the denominator does not become zero because the added correction matrix is contained in the denominator.

$$R'^{-1}_{xx} = \sum_{k=1}^{M} \frac{1}{\lambda_k + c_0} e_k e_k^H \quad (5)$$

In this way, by adding the correction matrix having diagonal elements to the correlation matrix prior to the calculation of the inverse matrix, the inverse matrix can be calculated without the inverse matrix calculation stopping in the middle of the processing. Furthermore, as the autocorrelation component of the signal is raised, and the crosscorrelation component is lowered, the effects of the noise component can be suppressed. That is, the accuracy and speed of the radio wave direction-of-arrival estimation can be enhanced.

Next, a description will be given of a prior art method that uses the Gauss-Jordan elimination method which is one inverse matrix calculation method. First, the procedure of the Gauss-Jordan method will be described with reference to FIGS. 9(A) to 9(H). In the Gauss-Jordan method, when performing an operation on the matrix in the left-hand side of FIG. 9(A), the same operation is performed on the unit matrix shown in the right-hand side of FIG. 9(A). First, in the condition shown in FIG. 9(A), each element in the first row is divided by the element in the first row and the first column, to obtain the condition shown in FIG. 9(B). In the example shown, no change occurs because the element in the first row and the first column is 1.

Next, in the condition of FIG. 9(B), values obtained by multiplying the elements in the first row by 2 are subtracted from the respective elements in the second row, while values obtained by multiplying the elements in the first row by 3 are subtracted from the respective elements in the third row, to obtain the condition shown in FIG. 9(C). Next, in the condition of FIG. 9(C), each element in the second row is divided by the element in the second row and the second column, to obtain the condition shown in FIG. 9(D).

Next, in the condition of FIG. 9(D), values obtained by multiplying the elements in the second row by 2 are subtracted from the respective elements in the first row, while values obtained by multiplying the elements in the second row by −2 are subtracted from the respective elements in the third row, to obtain the condition shown in FIG. 9(E). Next, in the condition of FIG. 9(E), each element in the third row is divided by the element in the third row and the third column, to obtain the condition shown in FIG. 9(F).

Next, in the condition of FIG. 9(F), values obtained by multiplying the elements in the third row by −1 are subtracted from the respective elements in the first row, while values obtained by multiplying the elements in the third row by 2 are subtracted from the respective elements in the second row, to obtain the condition shown in FIG. 9(G). As shown in FIG. 9(G), when the matrix in the left-hand side becomes the unit matrix, the matrix in the right-hand side is the inverse matrix of the matrix shown in the left-hand side of FIG. 9(A). That is, the equation shown in FIG. 9(H) holds.

Next, consider the case where the inverse matrix is calculated by transforming the matrix A shown in equation (6) into the matrix shown in equation (7).

$$A = \begin{bmatrix} 1 & 2 & 3 \\ 2 & 3 & 4 \\ 3 & 4 & 5 \end{bmatrix} \quad (6)$$

$$AE = \begin{bmatrix} 1 & 2 & 3 \\ 2 & 3 & 4 \\ 3 & 4 & 5 \end{bmatrix} \begin{bmatrix} 1 & 0 & 0 \\ 0 & 1 & 0 \\ 0 & 0 & 1 \end{bmatrix} \rightarrow EA^{-1} \quad (7)$$

Here, since the matrix A is singular, there arises the problem that the processing stops in the middle of the calculation of the inverse matrix as a diagonal matrix element becomes zero as shown in equation (8).

$$\begin{bmatrix} 1 & 0 & -1 \\ 0 & 1 & 2 \\ 0 & 0 & 0 \end{bmatrix} \begin{bmatrix} -3 & 2 & 0 \\ 2 & -1 & 0 \\ 1 & -2 & 1 \end{bmatrix} \quad (8)$$

In view of this, a second method of the present invention prevents the denominator from becoming zero by providing an adding means which, as shown in the following algorithm, adds a correction value $c_v$ only when any diagonal matrix element becomes a very small value in the middle of the inverse matrix calculation being performed in accordance with the equation (5) of the prior art inverse matrix calculation method.

for i=1 to M
  if $A_{ii}$<th
    $A_{ii}=A_{ii}+C_v$
  end
end

Figure 10:
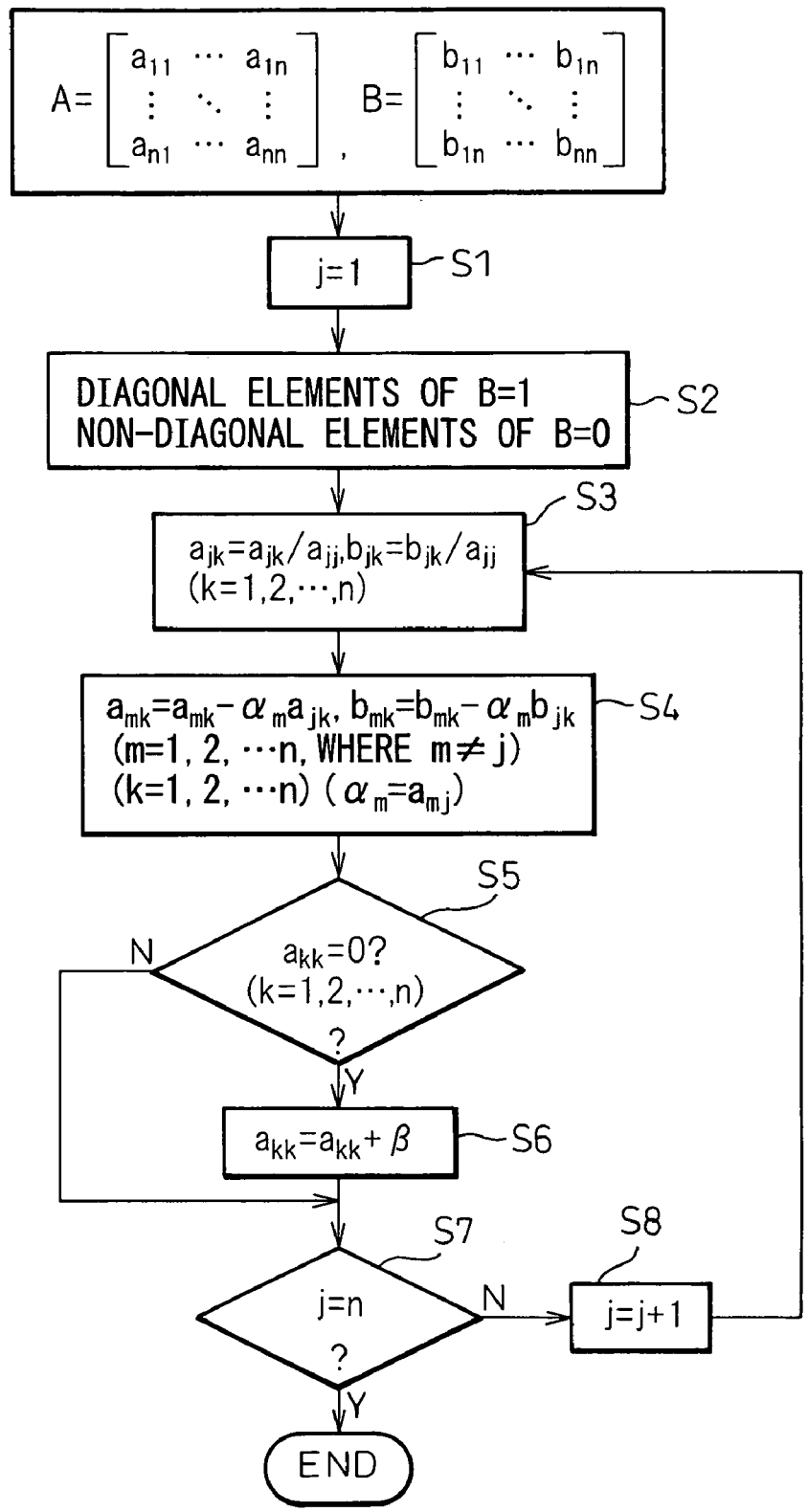
FIG. 10 is a flowchart illustrating the detailed procedure of inverse matrix calculation in accordance with a second method of the present invention.

Accordingly, with the second method also, the same effect as that achieved with the first method can be obtained. The flowchart of FIG. 10 shows the detailed procedure of the inverse matrix calculation according to the second method of the present invention. In the figure, A is the correlation matrix, and B is an arbitrary matrix having rows and column equal in number to the rows and columns in A. First, in step S1, parameter j is set to 1. Next, in step S2, the diagonal elements of B are set to 1, and the non-diagonal elements of B are set to 0, thereby setting B as the unit matrix.

Next, in step S3, the following operation is performed.

$a_{jk}=a_{jk}/a_{jj}$ $b_{jk}=b_{jk}/a_{jj}$ (k=1, 2, . . . , n)

Next, in step S4, the following operation is performed.

$a_{mk}=a_{mk}-\alpha_m a_{jk}$ $b_{mk}=b_{mk}-\alpha_m b_{jk}$ (m=1, 2, . . . , n, where m≠j)

(k=1, 2, . . . , n)

($\alpha_m=a_{mj}$)

Next, in step S5, it is determined whether the diagonal element $a_{kk}$ (k=1, 2, . . . , n) is zero or not; if $a_{kk}=0$, the process proceeds to step S6, but if $a_{kk}\neq 0$, the process proceeds to step S7. In step S6, a correction value β is added to the diagonal element $a_{kk}$, and the process proceeds to step S7. In step S6, the correction matrix described in connection with the first method may be added instead.

In step S7, it is determined whether j=n holds or not; if j≠n, then j is incremented in step S8, and the process loops back to step S3, but if j=n, the inverse matrix calculation process is terminated.

Embodiments of an apparatus for implementing the above-described first or second method will be described below with reference to the accompanying drawings. The embodiments hereinafter described are mainly applied to a radar apparatus. FIG. 1 is a block diagram showing a first embodiment of a radio wave direction-of-arrival estimation apparatus according to the present invention. The apparatus shown here comprises: an equispaced linear array antenna constructed from M antenna elements 10-1, 10-2, . . . , 10-M arranged linearly at equally spaced intervals; receivers 12-1, 12-2, . . . , 12-M for receiving incoming waves via the respective antenna elements; and a signal processor 20 for processing the signals received by the receivers.

The signal processor 20 comprises a correlation matrix calculator 22, a correction matrix adder 24, an inverse matrix calculator 26, a weight vector calculator 28, an angular spectrum calculator 30, and a direction-of-arrival estimator 32. The correlation matrix calculator 22 calculates the correlation matrix from the received signals. The correction matrix adder 24 adds to the correlation matrix a correction matrix that has a suitable correction value at each specific matrix element. The inverse matrix calculator 26 calculates the inverse matrix of the correlation matrix to which the correction matrix has been added. The weight vector calculator 28 calculates a weight vector in accordance with the Capon method. The angular spectrum calculator 30 calculates an angular spectrum in accordance with the Capon method by using the thus calculated weight vector. The direction-of-arrival estimator 32 estimates the direction of arrival of the incoming wave by using the peak waveform of the thus calculated angular spectrum.

Next, the process flow of the radio wave direction-of-arrival estimation apparatus according to the present embodiment will be described. First, based on the input signals $x_1(t), x_2(t), \ldots, x_M(t)$ received by the receivers 12-1, 12-2, . . . , 12-M via the respective antenna elements 10-1, 10-2, . . . , 10-M of the equispaced linear array antenna, the correlation matrix calculator 22 calculates the correlation matrix $R_{xx}$ as shown in equation (11). Here, L is the number of snapshots (the number of samples taken when obtaining the correlation matrix from the time average of the input samples).

$$R_{xx} = \frac{1}{L}\sum_{t=1}^{L} X(t)X^H(t) \tag{11}$$

$$X(t)=[x_1(t), x_2(t), \ldots, x_M(t)]^T \tag{12}$$

Next, as shown in equations (13) and (14) below, the correction matrix adder 24 obtains the correction matrix $C_1$ by multiplying the M×M unit matrix by a scalar that indicates the correction value $c_1$, and obtains $R_{xx}'$ by adding the correction matrix $C_1$ to the correlation matrix $R_{xx}$.

$$C_1 = c_1 \begin{bmatrix} 1 & 0 & \ldots & \ldots & 0 \\ 0 & \ddots & \ddots & & \vdots \\ \vdots & \ddots & \ddots & \ddots & \vdots \\ \vdots & & \ddots & \ddots & 0 \\ 0 & \ldots & \ldots & 0 & 1 \end{bmatrix} = \begin{bmatrix} c_1 & 0 & & \ldots & 0 \\ 0 & c_1 & 0 & & \\ & 0 & \ddots & \ddots & \vdots \\ \vdots & & \ddots & \ddots & 0 \\ 0 & & \ldots & 0 & c_1 \end{bmatrix} \tag{13}$$

$$R_{xx}'=R_{xx}+C_1 \tag{14}$$

Next, the inverse matrix calculator 26 calculates the inverse matrix $R_{xx}'^{-1}$ of the thus obtained $R_{xx}'$, and the weight vector calculator 28 calculates the weight vector shown in equation (15), in accordance with the Capon method, by using a mode vector $a(\theta)$, where $\theta$ denotes an azimuth parameter used in probing directions-of-arrival of incoming radio signals.

$$W_{CP} = \frac{R_{xx}'^{-1}a(\theta)}{a^H(\theta)R_{xx}'^{-1}a(\theta)} \tag{15}$$

Further, the angular spectrum calculator 30 calculates the angular spectrum $P_{CP}(\theta)$ shown in equation (16).

$$P_{CP}(\theta) = \frac{1}{a^H(\theta)R_{xx}'^{-1}a(\theta)} \tag{16}$$

Finally, the direction-of-arrival estimator 32 estimates the direction of arrival of the incoming wave based on the peak waveform of the thus calculated angular spectrum.

Here, the weight vector calculator 28 and the angular spectrum calculator 30 may employ the linear prediction method or other direction-of-arrival estimation techniques that estimate the direction by using the inverse matrix of the correlation matrix.

When performing the estimation using the linear prediction method, the weight vector calculator 28 calculates the weight vector shown in equation (17) in accordance with the linear prediction method by using an M-dimensional constant vector T and the inverse matrix $R_{xx}'^{-1}$ of the matrix $R_{xx}'$ shown in equation (14).

$$W_{LP} = \frac{R_{xx}'^{-1}T}{T^H R_{xx}'^{-1}T} \tag{17}$$

$$T=[1, 0, \ldots, 0]^T \tag{18}$$

Further, the angular spectrum calculator 30 calculates the angular spectrum shown in equation (19) by using the mode vector $a(\theta)$, and the direction-of-arrival estimator 32 estimates the direction of arrival of the incoming wave based on the peak waveform of the thus calculated angular spectrum.

$$P_{LP}(\theta) = \frac{1}{|W_{LP}^H a(\theta)|^2} \tag{19}$$

The array antenna need not necessarily be an equispaced linear array antenna constructed from antenna elements arranged linearly at equally spaced intervals, but may be some other suitably configured antenna, such as a non-equispaced linear array antenna constructed from antenna elements arranged linearly at unequally spaced intervals, a planar array antenna constructed from antenna elements arranged in a two-dimensional plane, or a circular array antenna constructed from antenna elements arranged in a circle. Further, the array antenna may be constructed as a phased-array antenna having antenna elements with adjustable phase shifters or as an adaptive array antenna having antenna elements with amplitude adjusters and adjustable phase shifters.

Further, any one of the correction matrices $C_2$ to $C_7$ shown in equations (20) to (25) below (one having the correction value at all matrix elements, one having the correction value at upper subdiagonal matrix elements, one having the correction value at lower subdiagonal matrix elements, one having the correction value at upper triangular matrix elements, one having the correction value at lower triangular matrix elements, or one having the correction value at tridiagonal matrix elements) may be employed as the correction matrix to be added to the correlation matrix. Alternatively, a plurality of matrices may be selected from among the correction matrices $C_1$ to $C_7$ shown in equations (13) and (20) to (25) and may be combined to construct a correction matrix such as the correction matrix $C_8$ shown in equation (26). In this case, however, the correction values must be set separately.

The correction value (correction matrix) to be added may be changed in accordance with the magnitude of the matrix element being monitored; for example, the value may be changed to a smaller value for a larger matrix element value and to a larger value for a smaller matrix element value. Such values may be prestored in the form of a table. As the minimum necessary correction value can be added, the effects that it will have on the estimation result can be minimized. Further, the correction value may be "multiplied" rather than "added".

$$C_2 = \begin{bmatrix} c_2 & \cdots & & c_2 \\ & c_2 & & \\ \vdots & & \ddots & \vdots \\ & & & \ddots \\ c_2 & \cdots & & c_2 \end{bmatrix} \quad (20)$$

$$C_3 = \begin{bmatrix} 0 & c_3 & 0 & \cdots & 0 \\ & 0 & c_3 & \ddots & \vdots \\ \vdots & & \ddots & \ddots & 0 \\ & & & \ddots & c_3 \\ 0 & & \cdots & & 0 \end{bmatrix} \quad (21)$$

$$C_4 = \begin{bmatrix} 0 & & \cdots & & 0 \\ c_4 & 0 & & & \\ 0 & c_4 & \ddots & & \vdots \\ \vdots & \ddots & \ddots & \ddots & \\ 0 & \cdots & 0 & c_4 & 0 \end{bmatrix} \quad (22)$$

$$C_5 = \begin{bmatrix} c_5 & \cdots & & & c_5 \\ 0 & c_5 & & & \\ & 0 & \ddots & & \vdots \\ \vdots & & \ddots & \ddots & \\ 0 & & \cdots & 0 & c_5 \end{bmatrix} \quad (23)$$

$$C_6 = \begin{bmatrix} c_6 & 0 & \cdots & & 0 \\ & c_6 & 0 & & \\ \vdots & & \ddots & \ddots & \vdots \\ & & & \ddots & 0 \\ c_6 & & \cdots & & c_6 \end{bmatrix} \quad (24)$$

$$C_7 = \begin{bmatrix} c_7 & c_7 & 0 & \cdots & 0 \\ c_7 & c_7 & c_7 & \ddots & \vdots \\ 0 & c_7 & \ddots & \ddots & 0 \\ \vdots & \ddots & \ddots & \ddots & c_7 \\ 0 & \cdots & 0 & c_7 & c_7 \end{bmatrix} \quad (25)$$

$$C_8 = \begin{bmatrix} c_{81} & c_{82} & & \cdots & c_{82} \\ c_{82} & c_{81} & c_{82} & & \\ & c_{82} & \ddots & \ddots & \vdots \\ \vdots & & \ddots & \ddots & c_{82} \\ c_{82} & \cdots & & c_{82} & c_{81} \end{bmatrix} (c_{81} > c_{82}) \quad (26)$$

Figure 2:
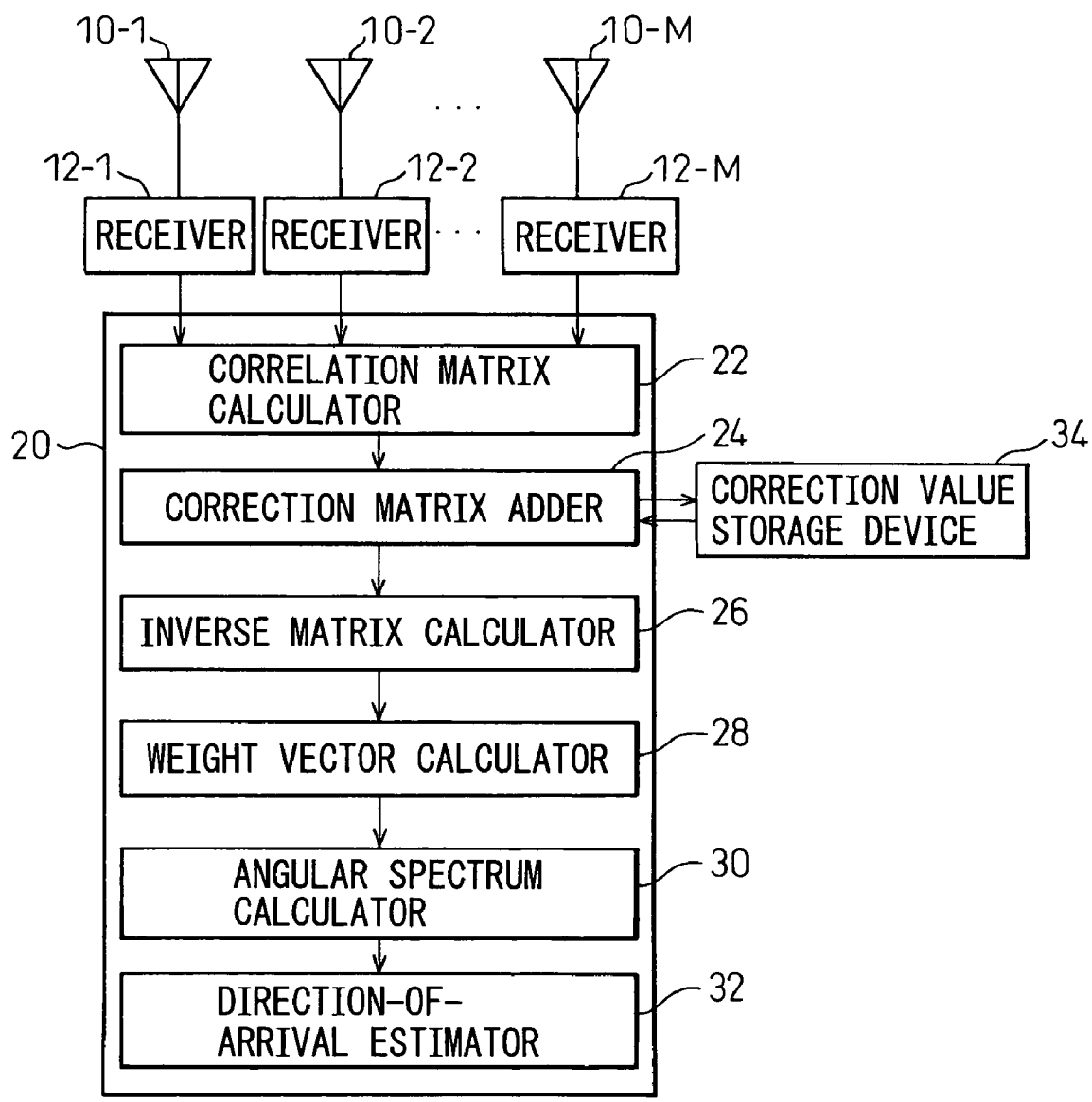
FIG. 2 is a block diagram showing a second embodiment of a radio wave direction-of-arrival estimation apparatus according to the present invention.

FIG. 2 is a block diagram showing a second embodiment of a radio wave direction-of-arrival estimation apparatus according to the present invention. The second embodiment differs from the foregoing first embodiment by the inclusion of a correction value storage device 34 to add to the component elements of the first embodiment. The correction value storage device 34 prestores the correction values to be used as the matrix elements of the correction matrix.

The previously mentioned table and the correction matrices $C_2$ to $C_7$, etc. may also be prestored. This serves to enhance the processing speed as there is no need to calculate the correction value each time.

Figure 3:
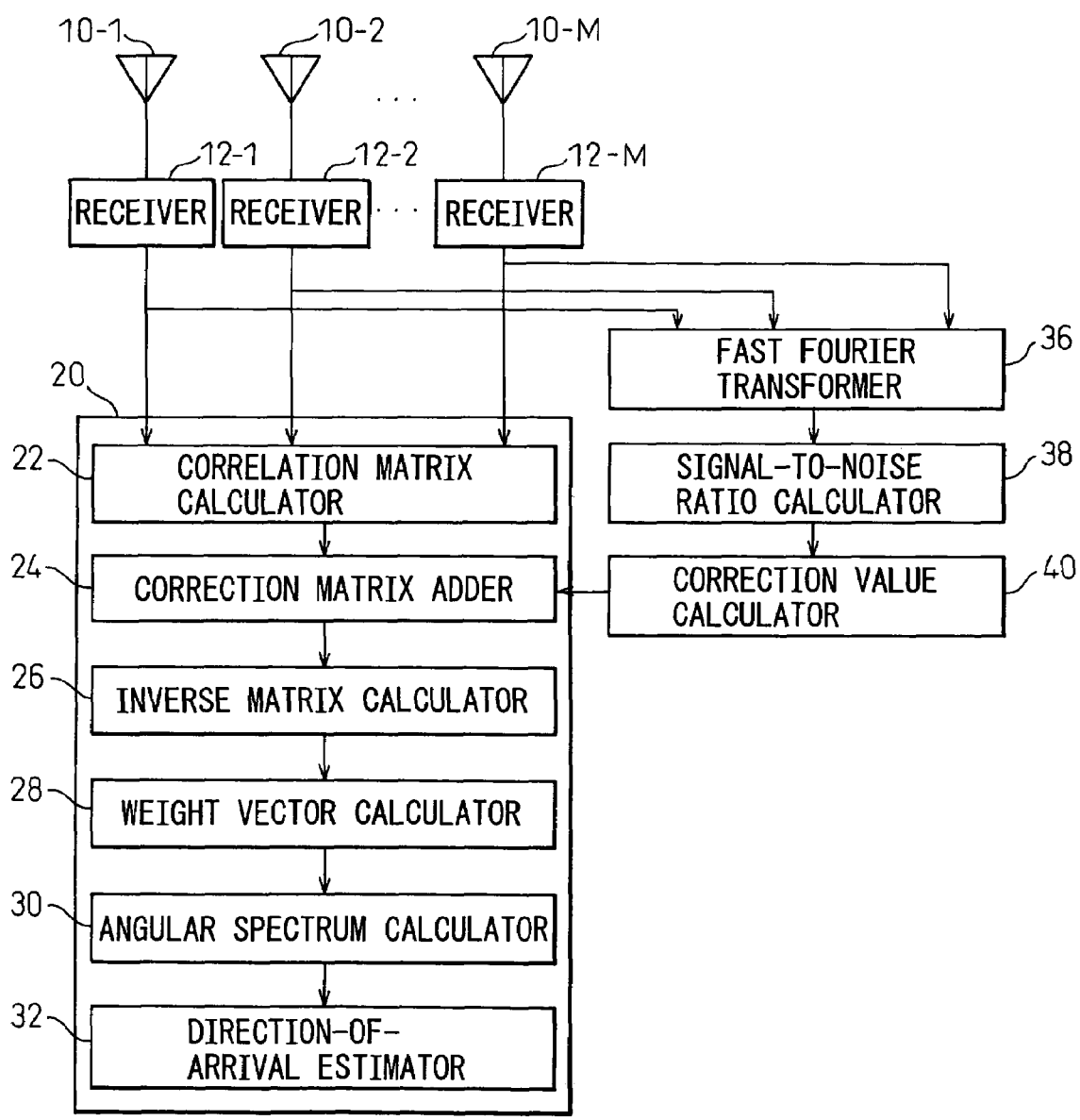
FIG. 3 is a block diagram showing a third embodiment of a radio wave direction-of-arrival estimation apparatus according to the present invention.

FIG. 3 is a block diagram showing a third embodiment of a radio wave direction-of-arrival estimation apparatus according to the present invention. The third embodiment differs from the first embodiment by the inclusion of a fast Fourier transformer 36, a signal-to-noise ratio calculator 38, and a correction value calculator 40 to add to the component elements of the first embodiment. The fast Fourier transformer 36 applies a fast Fourier transform to each received signal. The signal-to-noise ratio calculator 38 calculates the signal-to-noise ratio based on the signal power and noise power obtained by the fast Fourier transform. The correction value calculator 40 calculates the correction value based on the thus calculated signal-to-noise ratio. The most appropriate correction value can thus be obtained.

Here, any suitable parameters may be used to estimate the signal-to-noise ratio; for example, the signal-to-noise ratio may be estimated from reception power, target distance (previously measured value), or in the case of a vehicle, vehicle speed information or curve/slope information.

Figure 4:
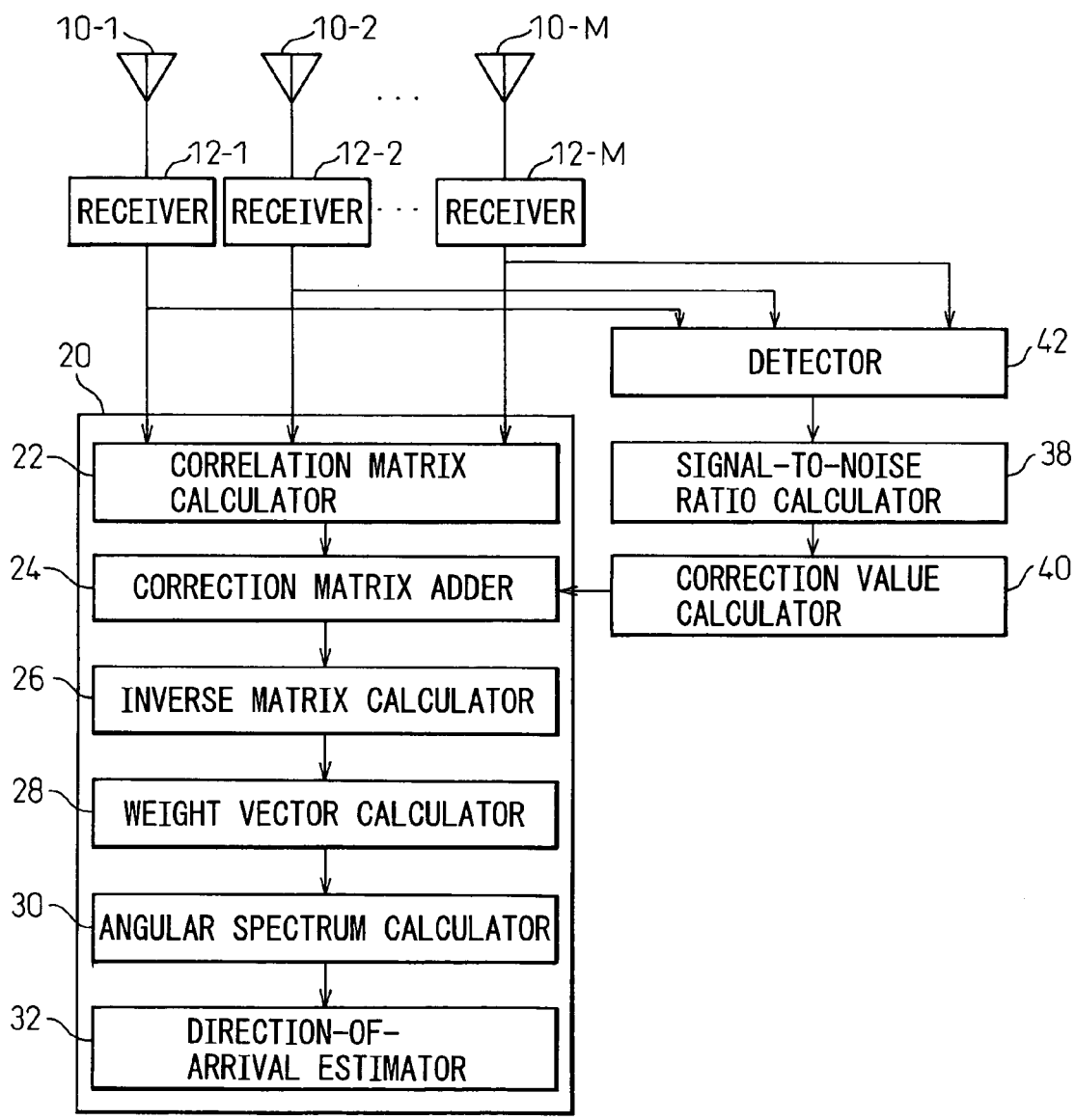
FIG. 4 is a block diagram showing a fourth embodiment of a radio wave direction-of-arrival estimation apparatus according to the present invention.

FIG. 4 is a block diagram showing a fourth embodiment of a radio wave direction-of-arrival estimation apparatus according to the present invention. The fourth embodiment differs from the first embodiment by the inclusion of a detector 42, a signal-to-noise ratio calculator 38, and a correction value calculator 40 to add to the component elements of the first embodiment. The detector 42 measures power of each received signal. The signal-to-noise ratio calculator 38 calculates the signal-to-noise ratio based on the signal power and noise power obtained by the power measurement. The correction value calculator 40 calculates the correction value based on the thus calculated signal-to-noise ratio. The most appropriate correction value can thus be obtained.

Figure 5:
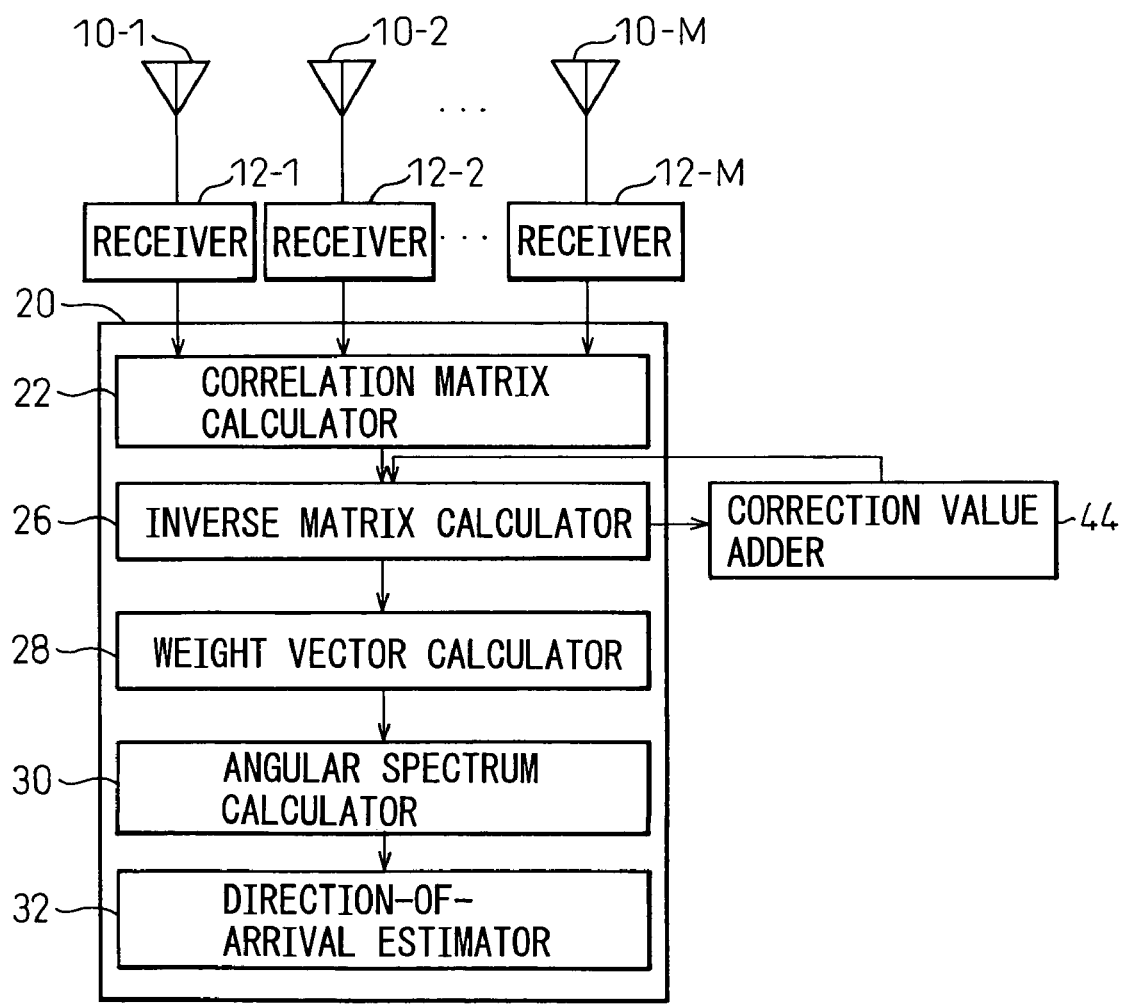
FIG. 5 is a block diagram showing a fifth embodiment of a radio wave direction-of-arrival estimation apparatus according to the present invention.

FIG. 5 is a block diagram showing a fifth embodiment of a radio wave direction-of-arrival estimation apparatus according to the present invention. The fifth embodiment differs from the first embodiment in that a correction value adder 44 is provided to replace the correction matrix adder 24 in the first embodiment. Only when it is determined that a specific matrix element is smaller than a predetermined value during the calculation of the inverse matrix of the correlation matrix, the correction value adder 44 adds a suitable correction value to that specific matrix element.

The process flow of the fifth embodiment is basically the same as the process flow of the first embodiment. However, since the processing in the inverse matrix calculator 26 as well as in the correction value adder 44 differs, the flow will be described. The inverse matrix calculator 26 performs processing as shown by transformation (51) to calculate the inverse matrix of the correlation matrix.

$$R_{xx}' \cdot E \to E \cdot R_{xx}'^{-1} \quad (51)$$

During the processing, if a specific element, for example, a diagonal element in the correlation matrix being converted is smaller in value than a sufficiently small threshold value, then the correction value adder 44 adds a correction value to that diagonal element. Instead, a correction matrix may be added here. The processing procedure is the same as that described with reference to FIG. 10. In the fifth embodiment also, the same effect as that achieved in the first embodiment can be obtained.

Figure 6:
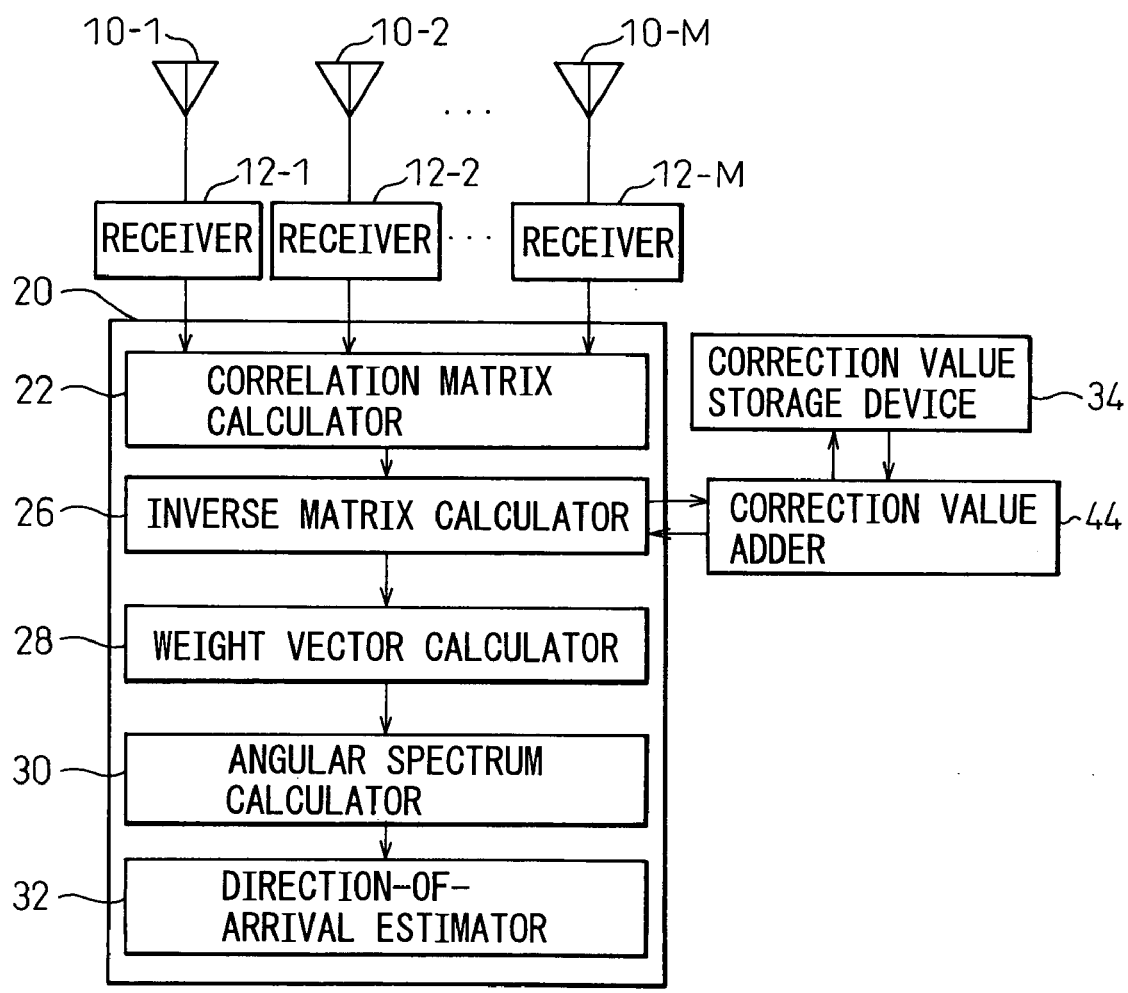
FIG. 6 is a block diagram showing a sixth embodiment of a radio wave direction-of-arrival estimation apparatus according to the present invention.

FIG. 6 is a block diagram showing a sixth embodiment of a radio wave direction-of-arrival estimation apparatus according to the present invention. The sixth embodiment differs from the foregoing fifth embodiment by the inclusion of a correction value storage device 34 to add to the component elements of the fifth embodiment. The correction value storage device 34 prestores the correction value to be added in the correction value adder 44. This serves to increase the versatility.

Figure 7:
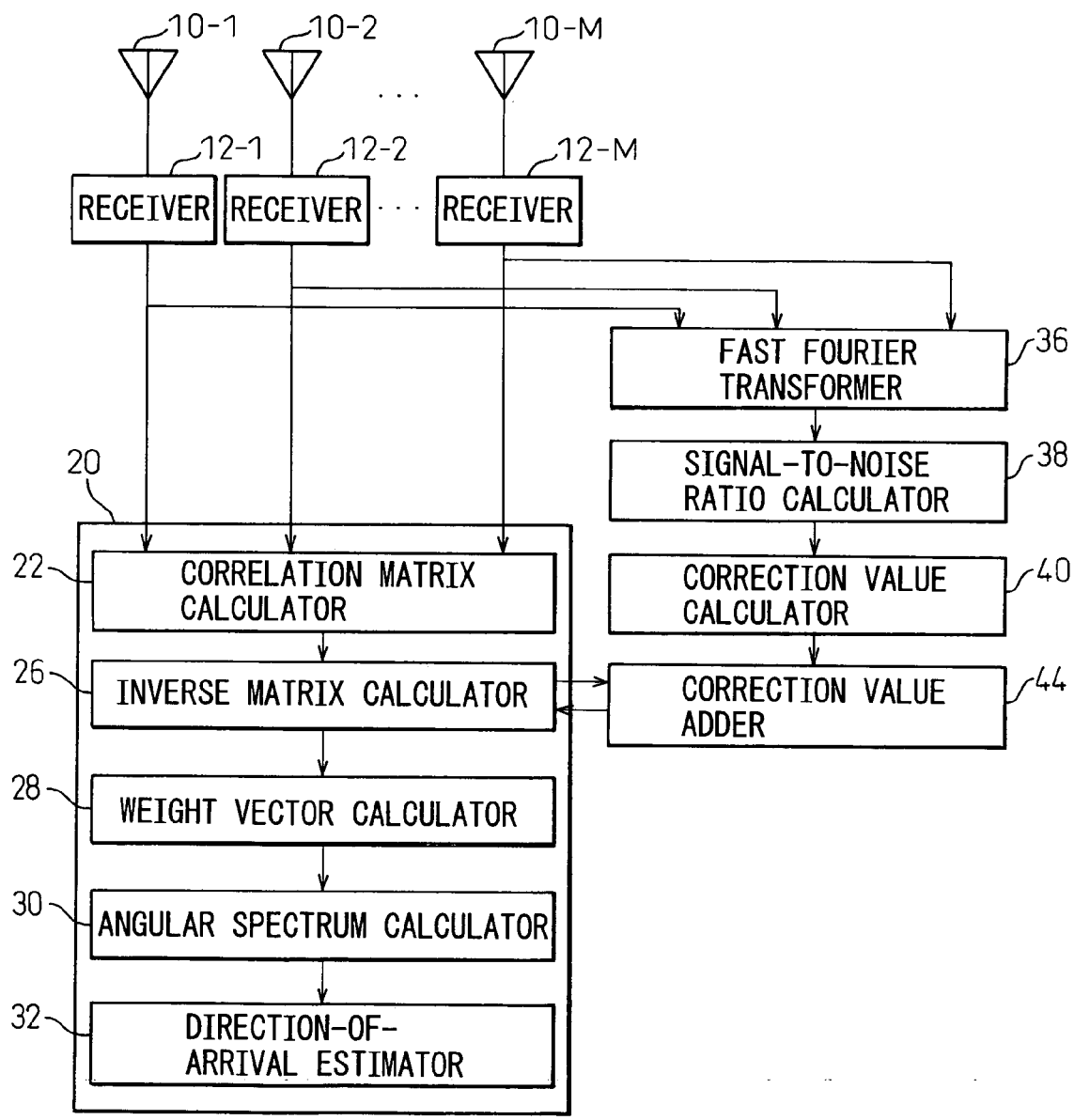
FIG. 7 is a block diagram showing a seventh embodiment of a radio wave direction-of-arrival estimation apparatus according to the present invention.

FIG. 7 is a block diagram showing a seventh embodiment of a radio wave direction-of-arrival estimation apparatus according to the present invention. The seventh embodiment differs from the fifth embodiment by the inclusion of a fast Fourier transformer 36, a signal-to-noise ratio calculator 38, and a correction value calculator 40 to add to the component elements of the fifth embodiment. The fast Fourier transformer 36 applies a fast Fourier transform to each received signal. The signal-to-noise ratio calculator 38 calculates the signal-to-noise ratio based on the signal power and noise power obtained by the fast Fourier transform. The correction value calculator 40 calculates the correction value based on the thus calculated signal-to-noise ratio. The most appropriate correction value can thus be obtained.

FIG. 8 is a block diagram showing an eighth embodiment of a radio wave direction-of-arrival estimation apparatus according to the present invention. The eighth embodiment differs from the fifth embodiment by the inclusion of a detector 42, a signal-to-noise ratio calculator 38, and a correction value calculator 40 to add to the component elements of the fifth embodiment. The detector 42 measures power of each received signal. The signal-to-noise ratio calculator 38 calculates the signal-to-noise ratio based on the signal power and noise power obtained by the power measurement. The correction value calculator 40 calculates the correction value based on the thus calculated signal-to-noise ratio. The most appropriate correction value can thus be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A radio wave direction-of-arrival estimation apparatus comprising:
   an array antenna constructed from a plurality of antenna elements;
   a receiver for receiving an incoming wave via each of said antenna elements of said array antenna;
   a correlation matrix calculating unit for calculating a correlation matrix from each signal received by said receiver;
   a correction matrix adding unit for adding a correction matrix having a correction value at a specific matrix element to said correlation matrix calculated by said correlation matrix calculating unit;
   an inverse matrix calculating unit for calculating an inverse matrix of said correlation matrix to which said correction matrix has been added by said correction matrix adding unit; and
   a direction-of-arrival estimating unit for estimating a direction of arrival of said incoming wave based on said inverse matrix calculated by said inverse matrix calculating unit.

2. A radio wave direction-of-arrival estimation apparatus comprising:
   an array antenna constructed from a plurality of antenna elements;
   a receiver for receiving an incoming wave via each of said antenna elements of said array antenna;
   a correlation matrix calculating unit for calculating a correlation matrix from each signal received by said receiver;
   an inverse matrix calculating unit for calculating an inverse matrix of said correlation matrix calculated by said correlation matrix calculating unit;
   a correction value adding unit for adding a correction value to a specific matrix element when said specific matrix element is determined to be smaller than a predetermined value during the calculation of said inverse matrix being performed by said inverse matrix calculating unit; and
   a direction-of-arrival estimating unit for estimating a direction of arrival of said incoming wave based on said inverse matrix calculated by said inverse matrix calculating unit.

3. A radio wave direction-of-arrival estimation apparatus comprising:
   an array antenna constructed from a plurality of antenna elements;
   a receiver for receiving an incoming wave via each of said antenna elements of said array antenna;
   a correlation matrix calculating unit for calculating a correlation matrix from each signal received by said receiver;
   an inverse matrix calculating unit for calculating an inverse matrix of said correlation matrix calculated by said correlation matrix calculating unit;
   a correction matrix adding unit for adding a correction matrix having a correction value at a specific matrix element to said correlation matrix during the calculation of said inverted matrix when any specific matrix element is determined to be smaller than a predetermined value during the calculation of said inverse matrix being performed by said inverse matrix calculating unit; and
   a direction-of-arrival estimating unit for estimating a direction of arrival of said incoming wave based on said inverse matrix calculated by said inverse matrix calculating unit.

4. A radio wave direction-of-arrival estimation apparatus of claim 1 or 3, further comprising a correction value storing unit for prestoring said correction value.

5. A radio wave direction-of-arrival estimation apparatus of claim 1 or 3, further comprising:
   a signal-to-noise ratio calculating unit for calculating a signal-to-noise ratio for each signal received by said receiver; and
   a correction value calculating unit for calculating said correction value based on said signal-to-noise ratio calculated by said signal-to-noise ratio calculating unit.

6. A radio wave direction-of-arrival estimation apparatus of claim 1 or 3, wherein said specific matrix element is a diagonal matrix element, a total matrix element, an upper subdiagonal matrix element, a lower subdiagonal matrix element, an upper triangular matrix element, a lower triangular matrix element, or a tridiagonal matrix element.

7. A radio wave direction-of-arrival estimation apparatus of claim 1 or 3, wherein said specific matrix element is a matrix element constructed from a combination of at least two matrix elements selected from among a diagonal matrix element, a total matrix element, an upper subdiagonal matrix element, a lower subdiagonal matrix element, an upper triangular matrix element, a lower triangular matrix element, and a tridiagonal matrix element.

8. A radio wave direction-of-arrival estimation apparatus of claim 1 or 3, further comprising a unit for calculating a weight vector from said inverse matrix and a unit for calculating an angular spectrum from said weight vector, wherein said weight vector calculating unit calculates said weight vector in accordance with a Capon method, and said angular spectrum calculating unit calculates said angular spectrum in accordance with said Capon method.

9. A radio wave direction-of-arrival estimation apparatus as of claim 1 or 3, further comprising a unit for calculating a weight vector from said inverse matrix and a unit for calculating an angular spectrum from said weight vector, wherein said weight vector calculating unit calculates said weight vector in accordance with a linear prediction method, and said angular spectrum calculating unit calculates said angular spectrum in accordance with said linear prediction method.

10. A radio wave direction-of-arrival estimation method comprising:
  calculating a correlation matrix from each signal received by a receiver via each antenna element of an array antenna;
  adding a correction matrix having a correction value at a specific matrix element to said calculated correlation matrix;
  calculating an inverse matrix of said correlation matrix to which said correction matrix has been added; and
  estimating a direction of arrival of an incoming wave based on said calculated inverse matrix.

11. A radio wave direction-of-arrival estimation method comprising:
  calculating a correlation matrix from each signal received by a receiver via each antenna element of an array antenna;
  calculating an inverse matrix of said calculated correlation matrix;
  adding a correction value to a specific matrix element when said specific matrix element is determined to be smaller than a predetermined value during the calculation of said inverse matrix; and
  estimating a direction of arrival of an incoming wave based on said calculated inverse matrix.

12. A radio wave direction-of-arrival estimation method comprising:
  calculating a correlation matrix from each signal received by a receiver via each antenna element of an array antenna;
  calculating an inverse matrix of said calculated correlation matrix;
  adding a correction matrix having a correction value at a specific matrix element to said correlation matrix during the calculation of said inverse matrix when any specific matrix element is determined to be smaller than a predetermined value during the calculation of said inverse matrix;
  adding said correction value to said specific matrix element; and
  estimating a direction of arrival of an incoming wave based on said calculated inverse matrix.

13. A radio wave direction-of-arrival estimation method of claim 10 or 12, further comprising prestoring said correction value.

14. A radio wave direction-of-arrival estimation method of claim 10 or 12, further comprising:
  calculating a signal-to-noise ratio for said each received signal; and
  calculating said correction value based on said calculated signal-to-noise ratio.

15. A radio wave direction-of-arrival estimation method of claim 10 or 12, wherein said specific matrix element is a diagonal matrix element, a total matrix element, an upper subdiagonal matrix element, a lower subdiagonal matrix element, an upper triangular matrix element, a lower triangular matrix element, or a tridiagonal matrix element.

16. A radio wave direction-of-arrival estimation method of claim 10 or 12, wherein said specific matrix element is a matrix element constructed from a combination of at least two matrix elements selected from among a diagonal matrix element, a total matrix element, an upper subdiagonal matrix element, a lower subdiagonal matrix element, an upper triangular matrix element, a lower triangular matrix element, and a tridiagonal matrix element.

17. A radio wave direction-of-arrival estimation method of claim 10 or 12, further comprising calculating a weight vector based on said inverse matrix and calculating an angular spectrum by using said weight vector, wherein said weight vector calculating process calculates said weight vector in accordance with a Capon method, and said angular spectrum calculating process calculates said angular spectrum in accordance with said Capon method.

18. A radio wave direction-of-arrival estimation method of claim 10 or 12, further comprising calculating a weight vector based on said inverse matrix and calculating an angular spectrum by using said weight vector, wherein said weight vector calculating process calculates said weight vector in accordance with a linear prediction method, and said angular spectrum calculating process calculates said angular spectrum in accordance with said linear prediction method.

19. A radar apparatus equipped with a radio wave direction-of-arrival estimation apparatus comprising:
  an array antenna constructed from a plurality of antenna elements;
  a receiver for receiving an incoming wave via each of said antenna elements of said array antenna;
  a correlation matrix calculating unit for calculating a correlation matrix from each signal received by said receiver;
  a correction matrix adding unit for adding a correction matrix having a correction value at a specific matrix element to said correlation matrix calculated by said correlation matrix calculating unit;
  an inverse matrix calculating unit for calculating an inverse matrix of said correlation matrix to which said correction matrix has been added by said correction matrix adding unit; and
  a direction-of-arrival estimating unit for estimating a direction of arrival of said incoming wave based on said inverse matrix calculated by said inverse matrix calculating unit.

20. A radar apparatus equipped with a radio wave direction-of-arrival estimation apparatus comprising:
- an array antenna constructed from a plurality of antenna elements;
- a receiver for receiving an incoming wave via each of said antenna elements of said array antenna;
- a correlation matrix calculating unit for calculating a correlation matrix from each signal received by said receiver;
- an inverse matrix calculating unit for calculating an inverse matrix of said correlation matrix calculated by said correlation matrix calculating unit;
- a correction value adding unit for adding a correction value to a specific matrix element when said specific matrix element is determined to be smaller than a predetermined value during the calculation of said inverse matrix being performed by said inverse matrix calculating unit; and
- a direction-of-arrival estimating unit for estimating a direction of arrival of said incoming wave based on said inverse matrix calculated by said inverse matrix calculating unit.

* * * * *

UNITED STATES PATENT AND TRADEMARK OFFICE
CERTIFICATE OF CORRECTION

PATENT NO. : 7,379,020 B2  Page 1 of 1
APPLICATION NO. : 11/372667
DATED : May 27, 2008
INVENTOR(S) : Masataka Tsuchihashi It is certified that error appears in the above-identified patent and that said Letters Patent is hereby corrected as shown below:

On the Title Page, item

(73) Assignee    Before "Fujitsu Limited, Kawasaki-Shi (JP)"
                 add --Fujitsu Ten Limited, Kobe-Shi (JP) and--

Signed and Sealed this

Twentieth Day of July, 2010

David J. Kappos
*Director of the United States Patent and Trademark Office*